US009824230B2

(12) United States Patent
Hildreth et al.

(10) Patent No.: US 9,824,230 B2
(45) Date of Patent: *Nov. 21, 2017

(54) REMOTE DATA ACCESS TECHNIQUES FOR PORTABLE DEVICES

(71) Applicant: Microsoft Technology Licensing, LLC, Redmond, WA (US)

(72) Inventors: Robert Hildreth, Bellevue, WA (US); Darren R. Davis, Woodinville, WA (US); Ryan A. Haveson, Monroe, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/242,304

(22) Filed: Apr. 1, 2014

(65) Prior Publication Data

US 2014/0304831 A1    Oct. 9, 2014

Related U.S. Application Data

(63) Continuation of application No. 11/726,494, filed on Mar. 22, 2007, now Pat. No. 8,719,375.

(51) Int. Cl.
*G06F 15/16* (2006.01)
*H04L 12/28* (2006.01)
(Continued)

(52) U.S. Cl.
CPC ...... *G06F 21/6218* (2013.01); *H04L 12/1813* (2013.01); *H04L 12/189* (2013.01); *H04L 67/104* (2013.01)

(58) Field of Classification Search
CPC ... H04L 67/06; H04L 67/104; H04L 67/1076; G06F 21/6218
See application file for complete search history.

(56) References Cited

U.S. PATENT DOCUMENTS 5,819,274 A    10/1998  Jackson, Jr.
6,310,889 B1   10/2001  Parsons et al.
(Continued)

FOREIGN PATENT DOCUMENTS

| AU | 2008229097 | 9/2008 |
|---|---|---|
| WO | 2005/026985 | 3/2005 |
| WO | 2008/115770 | 9/2008 |

OTHER PUBLICATIONS

Office Action Issued in Canada Patent Application No. 2681552, dated Jun. 18, 2014, 4 Pages.
(Continued)

*Primary Examiner* — Charles C Jiang
*Assistant Examiner* — Ryan Kavleski
(74) *Attorney, Agent, or Firm* — Mark K. Young; Mayer & Williams PC

(57) ABSTRACT

A wide-area network ("WAN")-based service enables remote data access transactions between participating endpoints within a group of participating endpoints that includes at least one server and at least one portable electronic device. Each participating endpoint is configured for communication via one or more communication networks and stores the same or different data items on behalf of a user. The WAN-based service maintains information about each participating endpoint in the group and its network accessibility, and also maintains one or more catalogs of available data items. The WAN-based service identifies a communication network available to both participating endpoints, and a direct or proxied communication session is established between the portable electronic device and the other participating endpoint via the communication network. Selected data items are downloaded, uploaded, accessed or synchronized via the communication session. The use of
(Continued)

digital rights and identity management techniques in combination with the WAN-based service is also discussed.

20 Claims, 4 Drawing Sheets

(51) Int. Cl.
    *G06F 21/62*     (2013.01)
    *H04L 12/18*     (2006.01)
    *H04L 29/08*     (2006.01)

(56) References Cited

U.S. PATENT DOCUMENTS

| | | |
|---|---|---|
| 6,728,532 B1 | 4/2004 | Ahonen |
| 6,934,963 B1 | 8/2005 | Reynolds et al. |
| 7,032,000 B2 | 4/2006 | Tripp |
| 8,095,500 B2 | 1/2012 | Rose et al. |
| 2003/0088571 A1 | 5/2003 | Ekkel |
| 2003/0174838 A1 | 9/2003 | Bremer |
| 2003/0177246 A1 | 9/2003 | Goodman et al. |
| 2003/0186704 A1 | 10/2003 | Tamura et al. |
| 2004/0148434 A1* | 7/2004 | Matsubara ............ H04L 67/104 709/246 |
| 2005/0086300 A1 | 4/2005 | Yeager et al. |
| 2005/0204038 A1 | 9/2005 | Medvinsky et al. |
| 2005/0249196 A1 | 11/2005 | Ansari et al. |
| 2005/0266835 A1 | 12/2005 | Agrawal et al. |
| 2006/0004600 A1* | 1/2006 | Summer et al. .................. 705/1 |
| 2006/0031407 A1 | 2/2006 | Dispensa et al. |
| 2006/0047729 A1 | 3/2006 | Yuan et al. |
| 2006/0107286 A1 | 5/2006 | Connor et al. |
| 2006/0161635 A1 | 7/2006 | Lamkin et al. |
| 2006/0240856 A1 | 10/2006 | Counts et al. |
| 2006/0242273 A1 | 10/2006 | Fiducci |
| 2007/0156719 A1* | 7/2007 | Upendran ......... G06F 17/30867 |
| 2008/0183574 A1* | 7/2008 | Nash ................. G06F 17/30864 705/14.54 |
| 2008/0232371 A1 | 9/2008 | Hildreth et al. |
| 2009/0083117 A1 | 3/2009 | Svendsen et al. |
| 2009/0216644 A1* | 8/2009 | Summer et al. ................ 705/14 |
| 2011/0113034 A1 | 5/2011 | Sidman |
| 2011/0231867 A1 | 9/2011 | Williams et al. |

OTHER PUBLICATIONS

"Notice of Preliminary Rejection Issued in Korean Republic of (KR) Patent Application No. 10-2009-7019243", dated Jan. 28, 2014, Filed Date: Mar. 14, 2008, 11 Pages.
"Notice of Allowance Issued in Malaysian Patent Application No. PI 20093700", dated May 30, 2014, Filed Date: Mar. 14, 2008, 2 Pages.
Malaysian Adverse Report dated Sep. 30, 2013 issued in connection with corresponding Malaysian Application No. PI20093700 (3 pages total).
International Search Report dated Jul. 10, 2008, in connection with corresponding International Application No. PCT/US2008/056930 (10 pages total).
Ahn, et al., "SEREFE: Serendipitous File Exchange Between Users and Devices", Date: 2005, pp. 39-46, ACM Press, New York, http://delivery.acm.org/10.1145/1090000/1085785/p39-ahn.pdf keyl=1085785&key2=0380385611&coll=ACM&dl=ACM &CFID=75919783&CFTOKEN=92791909 (8 pages total).
Calhoon John, "Mobile Computing with Windows XP", Date: Jul. 2001, http://download.microsoft.com/download/2/e/0l2eOe3caf-9005-4058-b3e5-4243 265 5b486/PRO/MobileComputingwithWindowsXP.doc (27 pages total).
Izadi, et al., "Dynamo: A Public Interactive Surface Supporting theCooperative Sharing and Exchange of Media", Date: 2003, pp. 159-168,ACM Press, New York, USA, http://delivery.acm.org/1O.1145/970000/964714/pl59-izadi.pdf?keyl=964714 &key2=9841385611&coll=GUIDE&dl=GUIDEAI:M &I:FTn=11111111&I:FTOKEN=2222222 (10 pages total).
Su, et al., "Raj icon: Remote PC GUI Operations via Constricted Mobile Interfaces", Date: 2002, pp. 251-262, ACM Press, New York, http://delivery.acm.org/10.1145/580000/570676/p251-su.pdf?keyl=570676&key2=2092385611&coll=ACM&dl=ACM &CFID=75919783&CFTOK EN=92791909 (12 pages total).
"Office Action Issued in Canadian Patent Application No. 2,681,552", dated Mar. 25, 2015, 5 Pages.
"Final Office Action Issued in U.S. Appl. No. 11/726,494", dated Nov. 15, 2012, 17 Pages.
"Final Office Action Issued in U.S. Appl. No. 11/726,494", dated Sep. 1, 2010, 17 Pages.
"Non-Final Office Action Issued in U.S. Appl. No. 11/726,494", dated Jun. 12, 2013, 17 Pages.
"Non-Final Office Action Issued in U.S. Appl. No. 11/726,494", dated Jun. 11, 2012, 20 Pages.
"Non-Final Office Action Issued in U.S. Appl. No. 11/726,494", dated Jun. 15, 2009, 30 pages.
"Non-Final Office Action Issued in U.S. Appl. No. 11/726,494", dated Jan. 15, 2010, 35 Pages.
"Office Action Issued in Canadian Patent Application No. 2681552", dated Jan. 7, 2016, 5 Pages.
"Fourth Office Action Issued in Chinese Patent Application No. 200880009022.7", dated Jan. 8, 2016, 6 Pages.
"Supplementary Search Report Issued in European Patent Application No. 08732177.4", dated Mar. 22, 2016, 9 Pages.
"Office Action Issued in Canadian Patent Application No. 2,681,552", dated Jun. 23, 2016, 5 Pages.
"Office Action Issued in Canadian Patent Application No. 2,681,552", dated Dec. 2, 2016, (5 Pages total).

\* cited by examiner

REMOTE DATA ACCESS TECHNIQUES FOR PORTABLE DEVICES

CROSS REFERENCE TO RELATED APPLICATION

This application is a continuation of U.S. Ser. No. 11/726,494, filed Mar. 22, 2007, entitled, "REMOTE DATA ACCESS TECHNIQUES FOR PORTABLE DEVICES", now U.S. Pat. No. 8,719,375, issued May 6, 2014, which is incorporated herein by reference in its entirety.

BACKGROUND

As people amass digital content and the cost of electronic storage continues to decline, digital content is increasingly hosted and consumed on a variety of devices (often referred to as endpoints), including but not limited to servers, personal computers, hand-held computers, portable phones, personal digital assistants, in-vehicle devices, and home entertainment devices.

Portable devices, which are generally equipped with connectivity features that allow communication over networks, have become immensely popular. Although electronic storage capacities of portable devices are increasing, they are still dwarfed by hard drive storage capacities available on servers, PCs, and other types of consumer electronics equipment. As such, portable devices are not generally used to store the majority of a person's digital content. In addition, certain digital content is protected by the intellectual property rights of others, and its use may be restricted in various ways.

There is a growing need for platforms and techniques that effectively allow people to use portable devices to remotely access digital content that is stored in various other endpoints in flexible, legal, and generally network-independent manners.

SUMMARY

Platforms and techniques for facilitating remote data access transactions between participating endpoints within a group of participating endpoints are discussed herein. The group of participating endpoints includes at least one server and at least one portable electronic device that store the same or different data items on behalf of a user. Each participating endpoint is configured for communication via one or more communication networks.

In each remote data access transaction, a wide-area network ("WAN")-based data access service facilitates access to select data items between first and second participating endpoints in the group of participating endpoints. Although data access transactions may be initiated by any participating endpoint, for discussion purposes it is assumed that the first participating endpoint is a portable electronic device that requests the downloading, uploading, accessing, or synchronization of one or more data items (which may or may not be stored by the portable electronic device) to/from the second participating endpoint. Generally, the WAN-based data access service maintains information about each participating endpoint in the group and its network accessibility, and also maintains one or more catalogs of available data items.

In one exemplary scenario, a user interface is presented to a user of the portable electronic device, the user reviews information about the participating endpoints in the group and/or data items stored thereby, and selects the second participating endpoint and particular data item(s) he desires to access via the user interface. In another exemplary scenario, the second participating endpoint and/or particular data item(s) are automatically selected via the use of various selection criteria. Examples of selection criteria include but are not limited to participating endpoint characteristics, data item characteristics, user profiles, and network characteristics.

The WAN-based data access service identifies a communication network available to both the portable electronic device and the second participating endpoint. A direct or proxied communication session is established between the portable electronic device and the other participating endpoint via the network, and the portable electronic device accesses (downloads, uploads, accesses, synchronizes, or otherwise transfers) selected data item(s) to/from the second participating endpoint via the communication session. In one exemplary implementation, the communication session is a point-to-point (direct or proxied) connection that supports the enumeration and/or exchange of data items using a particular protocol, such as Media Transfer Protocol ("MTP").

The use of digital rights and identity management techniques in combination with the WAN-based data access service described herein accommodates a wide variety of business models that simultaneously support the often diverse interests of individual users and different sources of digital content, such as online service providers, media content creators and distributors, and network operators.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

A remote data access service, aspects of which are hosted within a wide-area network ("WAN"), enables remote data access transactions between selected first and second participating endpoints within an architecture including a group of participating endpoints. The group of participating endpoints includes at least one server and at least one portable electronic device, but generally includes a variety of servers/services and consumer devices. Each participating endpoint in the group is configured for communication via one or more communication networks.

The WAN-based data access service maintains information about each participating endpoint in the group and its network accessibility. After the WAN-based service identifies a communication network available to two participating endpoints in a data access transaction, a direct or proxied communication session is established between the participating endpoints via the identified communication network. Selected data items may be downloaded, uploaded, accessed or synchronized via the communication session. Aspects of identity management and digital rights management are generally handled prior to the establishment of the communication session or as an additional portion of enveloped data sent with each transaction, by the WAN-based remote data access service or third party services. Although data access transactions may be initiated by any participating endpoint, for discussion purposes it is assumed that the first participating endpoint is a portable electronic device that requests the downloading, uploading, remote access, or synchronization of one or more data items (which may or may not be stored by the portable electronic device) to/from the second participating endpoint.

Figure 1:
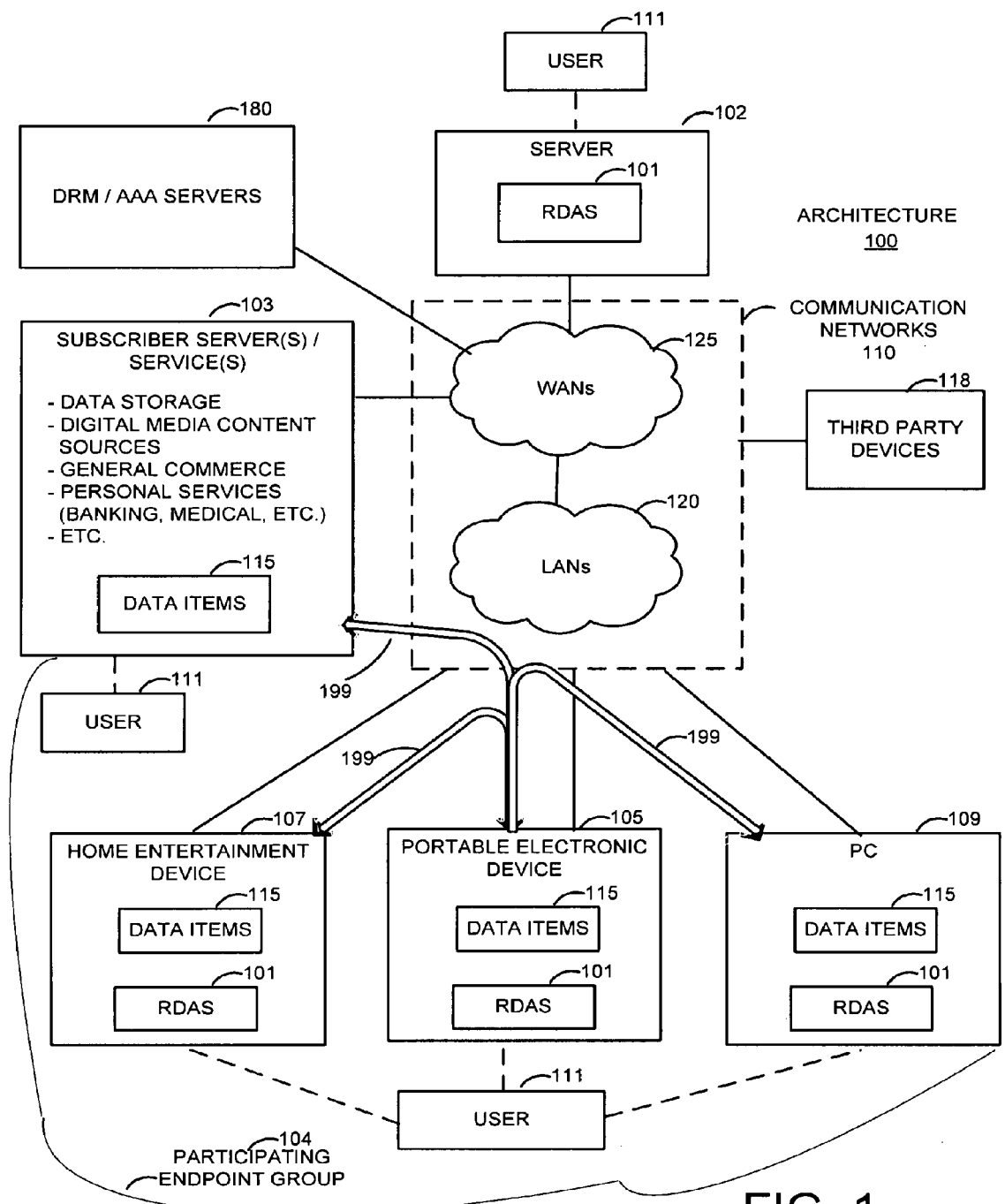
FIG. 1 is a simplified functional block diagram of an architecture including a remote data access service that facilitates access to data items stored on any participating endpoint within a group of participating endpoints.

Turning to the drawings, where like numerals designate like components, FIG. 1 is a simplified block diagram of an architecture 100 that includes a remote data access service ("RDAS") 101 (discussed in connection with FIG. 2), aspects of which are implemented in one or more servers 102 within wide-area network(s) 125 (discussed further below) and within participating endpoints ("PEs") within participating endpoint group ("PEG") 104 (both PEs and PEG 104 are also discussed further below). RDAS 101 facilitates remote data access transactions via communication sessions 199 (discussed in connection with FIGS. 2 and 3) between participating endpoints within participating endpoint group 104.

PEG 104 represents a group of devices (PEs) used to store the same or different data items 115 on behalf of a user 111. It should be noted that a particular PE is not necessarily dedicated to storing data items 115 on behalf of user 111—PEs may also store data items on behalf of other users. PEG 104 is generally dynamic, changing over time as PEs are added, removed, substituted for other PEs, and/or are able to connect to various different communication networks 110 (discussed further below). Generally, PEG 104 is considered to have a "multimaster synchronization topology," because more than one PE can concurrently modify the same data item, causing potential conflicts when such PEs attempt to synchronize with each other. Such conflicts are referred to as "synchronization conflicts."

Data items 115 represent any commercial or non-commercial digital content stored on behalf of user 111. Examples of data items 115 include but are not limited to digital media content (such as audio files, video files, image files, multimedia files, and playlists), documents, spreadsheets, consumer transaction data, digital payment instruments, user profiles, endpoint characteristics (discussed further below), contacts, metadata, digital licenses, and the like. Data items 115 may exist in any known or later developed format or combination thereof. Data items 115 may be protected by one or more enforceable intellectual property rights of one or more third parties, such as copyrights, patent rights, trademark rights, or trade secret rights.

PEG 104 includes at least one server 103 operating within wide-area network(s) 125, which may be the same as server 102 or a different server. As shown, servers 103 host a variety of services accessible by user 111, including but not limited to data storage services, digital media content source services (for example, music download services), general commerce services (for example, near-field shopping services), and personal services (such as online banking, pharmacy services, etc.). PEG 104 also includes at least one portable electronic device 105 such as a mobile phone, a personal digital assistant, a personal media player, an image or video capture device, a DVD player, a portable navigation device ("PND"), or a device temporarily or permanently mounted in transportation equipment such as a plane, or train, or wheeled vehicle. PEG 104 is also shown to include a home entertainment device 107 (such as a set-top box, a game console, a digital video recorder, a television, a home network router, hard drive storage device, a local media gateway, and the like) and a personal computer ("PC") 109. Each PE is configured for communication via one or more communication networks 110.

Collectively, communication networks 110 represent any existing or future, public or private, wired or wireless, wide-area ("WANs" 125) or local-area ("LANs" 120), packet-switched or circuit-switched, one-way or two-way digital data transmission infrastructures or technologies. Exemplary networks 110 include: the Internet; managed WANs (for example, cellular networks, satellite networks, fiber-optic networks, co-axial cable networks, hybrid networks, copper wire networks, and over-the-air broadcasting networks such as television, radio, and datacasting networks); and local area networks (for example, wireless local area networks and personal area networks).

Third party devices 118, which represent any electronic device or aspect thereof not controlled by user 111, are configured for communication via one or more communication networks 110.

DRM/AAA servers 180 represent any network-side implementations of digital rights management ("DRM") systems or techniques or authentication, authorization, and accounting ("AAA") systems or techniques. DRM/AAA servers 180 and services are generally used in combination with aspects of the remote data access transactions facilitated by RDAS 101.

Figure 2:
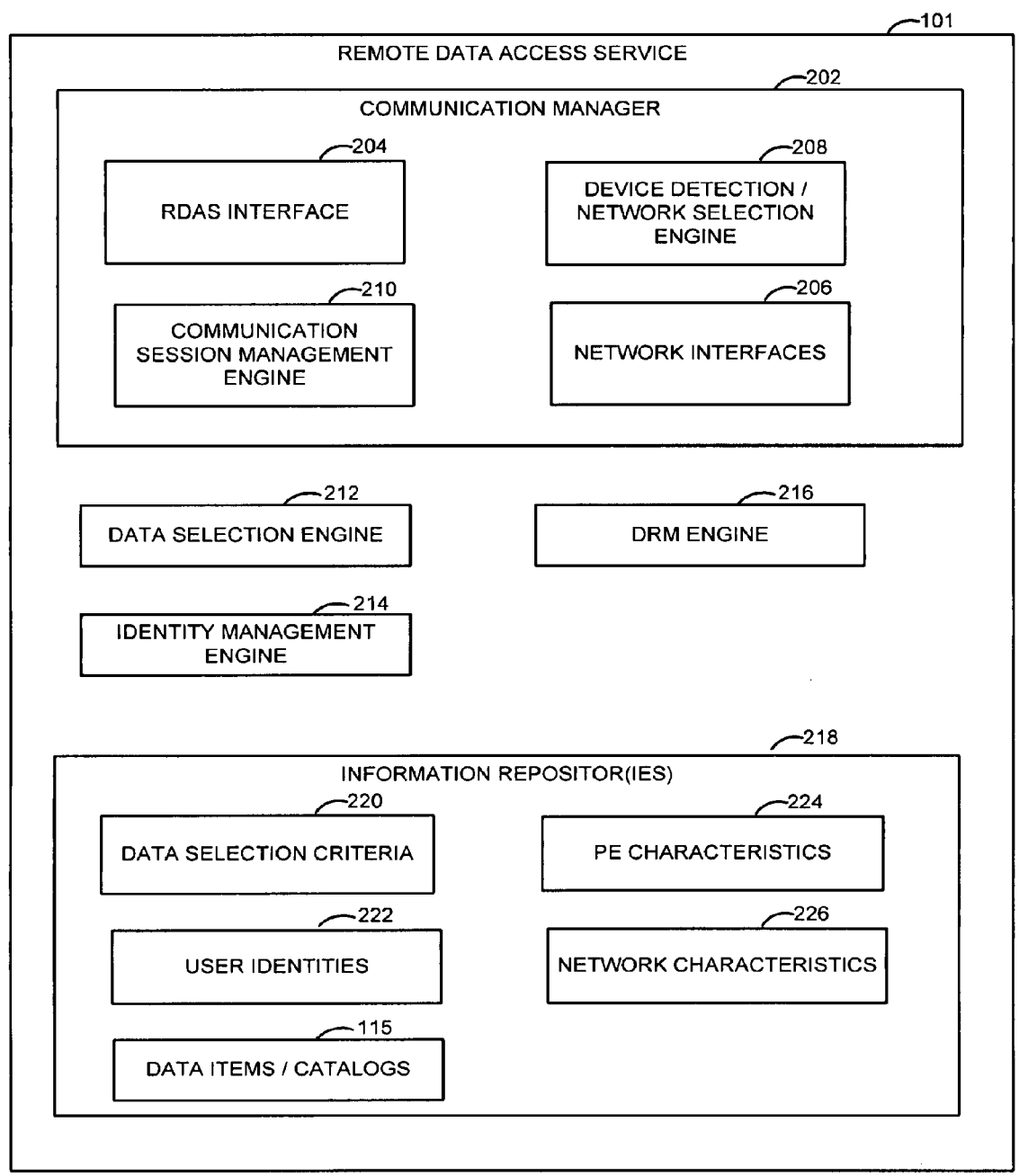
FIG. 2 is a simplified functional block diagram of the remote data access service shown in FIG. 1.

FIG. 2 is a simplified functional block diagram of RDAS 101 shown in FIG. 1. RDAS 101 generally facilitates the remote access by PEs within PEG 104 to data items 115 stored by other PEs within PEG 104. As such, RDAS 101 arranges for the discovery of PEs within PEG 104, identifies communication networks 110 accessible by the PEs to enable establishment of communication sessions 199 between particular PEs, and facilitates identification of data items 115 that are available for access by the PEs.

Within WANs 125, aspects of RDAS 101 are implemented within one or more servers 102, 103. A WAN-based RDAS 101 may be implemented as a network-side computer program such as a Web service, for example. Aspects of RDAS 101 are also implemented within PEs (for example, by one or more computer programs). In general, design choices and/or operating environments (for example, a network-side environment or a client-side environment) dictate how and whether specific functions of RDAS 101 are implemented. Such functions may be implemented using hardware, software, firmware, or combinations thereof. Particular configurations of RDAS 101 may include fewer, more, or different components than those described. It will further be understood that computer programs that pertain to the establishment of remote data access transactions between PEs may operate at any layer of a communication protocol stack, such as at any layer of the well-known stack that defines internetworking: layer 1, the Physical Layer;

layer 2, the Data Link Layer; layer 3, the Network Layer; layer 4, the Transport Layer; layer 5, the Session Layer; layer 6, the Presentation Layer; and layer 7, the Application Layer.

As shown, RDAS 101 includes: communication manager 202, which further includes RDAS interface(s) 204, network interface(s) 206, device detection/network selection engine 208, and communication session management engine 210; data selection engine 212; identity management engine 214; DRM engine 216; and information repositories 218, which store data items/catalogs 115, data selection criteria 220, user identities 222, PE characteristics 224, and network characteristics 226.

Figure 4:
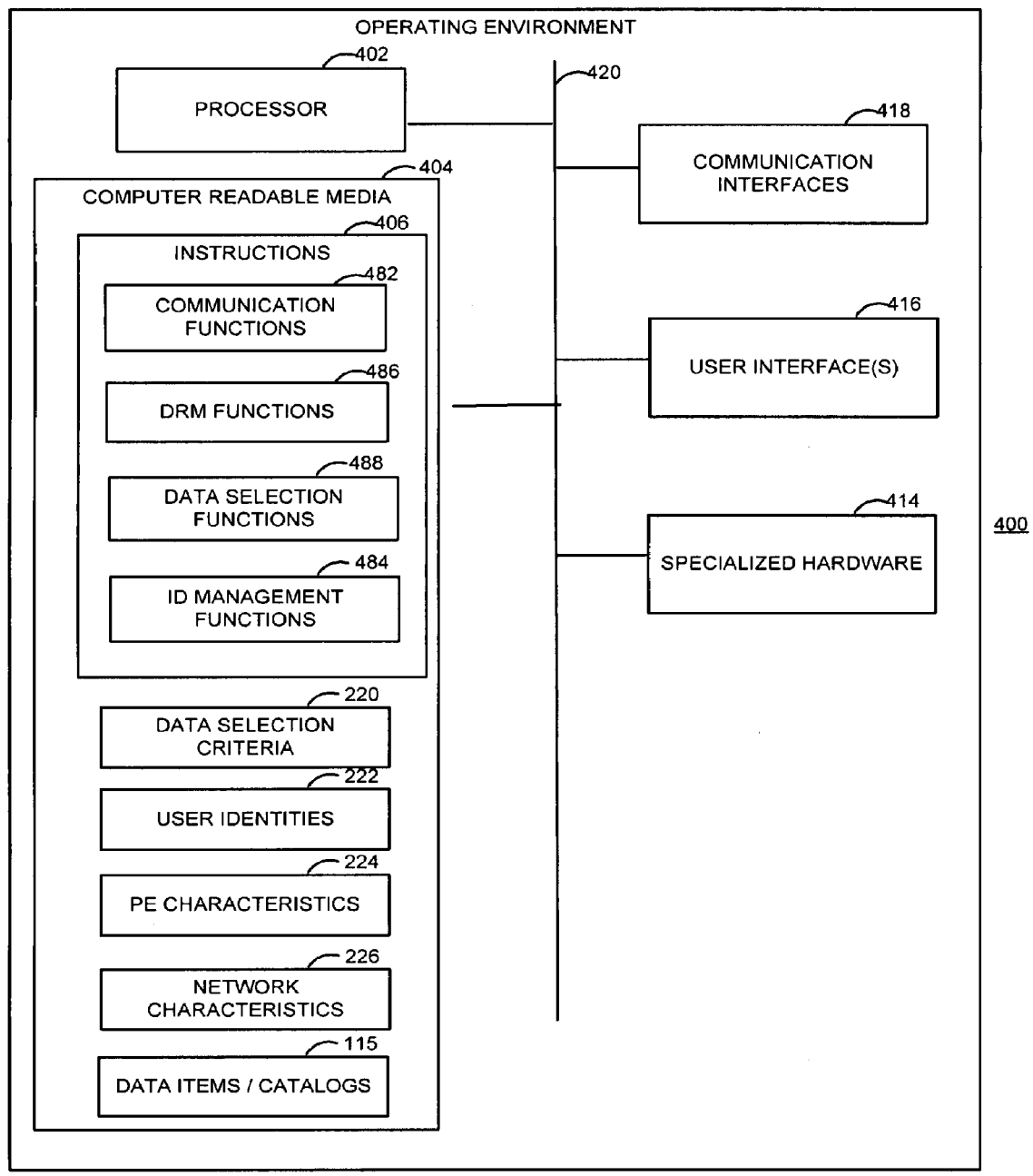
FIG. 4 is a simplified functional block diagram of an exemplary operating environment, with which aspects of the service shown in FIG. 2 and/or the method illustrated in FIG. 3 may be used.

Information repositories 218 represent general data storage capability for information relating to remote data access transactions conducted via RDAS 101. Information repositories 218 may be implemented using various types and arrangements of computer-readable media 404 (discussed further below, in connection with FIG. 4).

User identities 222 represent the pieces of information about user 111 and/or PEs within PEG 104 that an issuer (user 111 or another entity) asserts are valid. Collectively, these pieces of information are referred to as "claims". Identity management engine 214 (discussed further below) is responsible for the management of user identities 222.

Data selection criteria 220 represent any information usable by RDAS 101 or user 111 for decision-making regarding remote data access transactions. As such, data selection criteria 220 may be used to: identify data item(s) 115, identify PEs within PEG 104, or identify communication networks 110; determine how selected data items(s), PEs, or communication networks are accessed; determine where or when selected data item(s), PEs, or communication networks are accessed (for example, data items may be queued for delivery and/or timing for delivery established); and obtain authorization for access to data item(s), PEs, or communication networks. Data selection criteria 220 may be received from user 111 (via RDAS interface 204, for example), or received in other ways, such as by being pre-programmed into a particular PE and/or RDAS 101, or received from a third party (for example, a local or remote service).

It will be appreciated that virtually unlimited data selection criteria 220 and combinations thereof are definable. Examples of data selection criteria 220 include but are not limited to: information about user 111 (such as user profiles, user preferences, user identities 222, information collected based on previous activities of the user with respect to RDAS 101 or other services, and electronic affiliations of user 111 with other people or services as determined by user communities, buddy lists or service subscriptions); PE characteristics 224 (discussed further below); business rules; temporal references (such as times, dates, or time zone data); information related to data items 115 (such as data item type/format, parental control ratings, presentation formats or quality, price/promotions, genre, source, titles, artists, release dates, times, and the like); and network characteristics 226 (discussed further below). To address privacy concerns, user 111 may have control over whether and/or which information about user 111 is collected and used by RDAS 101.

Data items/catalogs 115 represent data items 115 (or references thereto) that are stored by one or more PEs. In one scenario, WAN-based RDAS 101 maintains one or more catalogs of data items 115 (or references thereto) that are stored on various PEs within PEG 104. It will be appreciated that in some instances data items 115 may be identifiable but unavailable—for example, the PE that stores a particular data item may be offline. It may be desirable, but is not necessary, to represent and/or store data items 115 associated a particular PE in a dedicated area on a particular information repository 218. Such catalogs may be accessed by a PE-based RDAS 101 and searched using standard search algorithms, based on user-input or automatic queries derived from data selection criteria 220. Because architecture 100 is flexible, various functions (such as searching for data items and presenting search results, queueing data items, or timing delivery of data items) can be performed using network-side processing, client-side processing, or a combination thereof. For example, a Web server accessible via WAN-based RDAS 101 may provide access to data item catalogs via normal Web-based protocols such as HTTP and XML, or a rich client can perform complex searches and presentation of data items using SQL queries or supported Web Services.

PE characteristics 224 represent information about particular PEs within PEG 104. Examples of PE characteristics 224 include but are not limited to information about a particular PE device or class thereof, such as device type, identification number(s), destination address (for example, IP address and port) information, processing capability, network connectivity capabilities, display capabilities, and memory capabilities.

Network characteristics 226 represent dynamic or static information about communication networks 110. Examples of network characteristics 226 include but are not limited to network access protocols, network latency, network availability, network bandwidth, network usage level, network reliability, and network usage cost.

With continuing reference to RDAS 101 depicted in FIG. 2, communication manager 202 includes one or more physical or logical elements, such as connectivity devices or computer-executable instructions, which enable communication between WAN-based RDAS 101 and PE-based RDAS 101, or between two PE-based RDASs 101, via one or more communication networks 110. In one exemplary implementation, communication manager 202 and functions thereof are implemented by an instant-messaging-type service such as the Microsoft Windows® Live Messenger™ service.

RDAS interfaces 204 are physical or logical elements that define manners of interacting with a particular application or device. One form of RDAS interface is a user interface. Generally, presentation tools are used to receive input from, or provide output to, a user. An example of a physical presentation tool is a display such as a monitor device. An example of a logical presentation tool is a data organization technique (such as a window, a menu, or a layout thereof). Controls facilitate the receipt of input from a user. An example of a physical control is an input device such as a remote control, a display, a mouse, a pen, a stylus, a microphone, a keyboard, a trackball, or a scanning device. An example of a logical control is a data organization technique via which a user may issue commands. It will be appreciated that the same physical device or logical construct may function as an interface for both inputs to, and outputs from, a user. Alternate embodiments of RDAS interfaces 204 include web services, remote procedure calls, or other technologies by which information is transferred to RDAS 101 for the purpose of controlling the functions of or displaying information about the components of RDAS 101.

Network interfaces 206 pertain to the receipt and processing of data by a particular device, as such data traverses layers of communication protocols, such as communication protocols associated with the well-known abstract model that defines internetworking: layer 1, the Physical Layer; layer 2, the Data Link Layer; layer 3, the Network Layer; layer 4, the Transport Layer; layer 5, the Session Layer; layer 6, the Presentation Layer; and layer 7, the Application Layer. As such, network interfaces 206 may include data interfaces, operations support interfaces, radio frequency interfaces, and the like (implemented, for example, by routers, switches, modems, or other network connection support devices or software at each device).

Device detection/network selection engine 208 is responsible for discovering aspects of one or more RDAS 101 systems hosted by a PE and/or WAN(s) 125, and for identifying one or more communication networks 110 via which communication sessions between PEs may be established. Discovery of services or PEs can be federated through any service or protocol (for example, a directory lookup based on an address book, a network directory service, or in another manner). In one scenario, WAN-based RDAS 101 maintains a list of PEs within PEG 104, along with the current network accessibility of each available PEs. Each PE-based RDAS 101 is generally configured to connect with WAN-based RDAS 101 (via predetermined protocols and networks, such as Internet-based Web Services protocols or other known or later developed protocols) whenever the PE-based RDAS is running WAN-based RDAS 101 may maintain a record of the current IP address and port number assigned to each PE-based RDAS 101 within PEG 104, and can provide such information to other PEs within PEG 104, allowing for the establishment of direct or proxied communication sessions 199 between PEs.

Communication session management engine 210 is responsible for arranging for the establishment of communication sessions 199 between PEs, and for facilitating access to data items 115 via the communication sessions. Data items may be downloaded, uploaded, synchronized, or otherwise accessed or transferred between PEs. In addition, user interfaces can be remoted via the communication sessions. Generally, once a requesting PE-based RDAS 101 has discovered WAN-based RDAS 101 and presented a particular verifiable user identity 222, the requesting PE-based RDAS 101 receives the current IP address and port number assigned to another (requested) PE-based RDAS 101 within PEG 104 that stores, or is designated to receive, certain identified data item(s) 115. Then, communication session 199 may be established directly between the requesting and requested PEs via any available network. Alternatively, WAN-based RDAS 101 may act as a proxy service that contacts a "home" service with which a particular PE is registered, and may serve as a point of interconnection for communications between PEs on different networks or to facilitate communications across firewalls by tunneling the protocol(s) through HTTP. It will be appreciated that incompatible communication protocols or networks may be managed by WAN-based RDAS 101 or a designated third party server/service by applying various known or later developed wired or wireless bridging techniques between communication protocols or networks to enable a particular communication session to be established even when PEs do not use the same communication protocols or networks.

One type of communication session 199 that may be established between PE-based RDASs is a peer-to-peer ("P2P") communication session. Although in practical application a P2P communication session may often be wireless, it will be appreciated that a P2P communication session may be wired, wireless, involve physical media (for example, a flash drive), or any combination thereof. In one exemplary implementation, communication session 199 is a point-to-point connection that supports the enumeration and/or exchange of data items. One possible protocol is Media Transfer Protocol ("MTP"). Other types of communication sessions (such as client-server communication sessions) and/or protocols are also possible.

Referring again to RDAS 101 depicted in FIG. 2, data selection engine 212 is responsible for identifying data items stored on one or more PEs within PEG 104. Aspects of data selection engine 212 are generally hosted in PE-based RDASs 101 but may be hosted within WAN-based RDAS 101. Data selection engine 212 may utilize, at any point during a remote data access transaction, data selection criteria 220, user identities 222, PE characteristics 224, network characteristics 226, or any combination thereof, to identify data items. Certain data items 115 or subsets thereof may be pre-identified or identified at runtime.

In one exemplary scenario, a user interface is presented to a user of a PE within PEG 104, such as portable electronic device 105, the user reviews information about the other PEs in the group and/or data items stored thereby, and selects the second PE and particular data item(s) he desires to access (upload, download, access, synchronize, or otherwise transfer) via the user interface. In another exemplary scenario, the second PE and/or particular data item(s) are automatically selected via the use of various data selection criteria 220.

It is generally desirable for data selection engine 212 (or another component of RDAS 101) to implement certain customizable data access features. One desirable data access feature is access to data items 115 in formats that are usable by particular PEs. Accordingly, in one scenario, data items 115 may be transcoded (via data selection engine 212 or another component) into a selected format prior to being accessed by a particular PE. The process of transcoding is well-known and can include (depending on device capabilities), for example, converting files from one format to another, down-sampling files to have lower bit rates or decoding requirements, and adapting the displayable screen size of a an image or video. Transcoding can also include various other processes, and those mentioned herein are included by way of example only and not by way of limitation. The selected format may be based on data selection criteria 220, user identities 222, PE characteristics 224, network characteristics 226, or any combination thereof. Any known or later developed techniques may be used by a transcoding manager (not shown) to control on-the-fly or pre-performed data transcoding and/or storage processes.

Another desirable data access feature relates to the synchronization of data items 115 between PEs within PEG 104. It is generally desirable to resolve synchronization conflicts that may occur, and to avoid propagating known synchronization conflicts to other PEs. Any known or later developed technique for such conflict resolution may be employed by data selection engine 212 or another component. In one scenario, each PE may monitor changes it makes to particular data items, and maintain/represent knowledge of such changes in a manner that is sharable with other PEs within PEG 104. Automatic conflict resolution policies may also be employed, such as policies that govern the orchestration of synchronization operations between multiple PEs (for example, filters such as user identities 222, data selection criteria 220, PE characteristics 224, and network characteristics 226 may be used to specify data items to synchronize, synchronization times, synchronization networks, and the like).

A further desirable data access feature relates to monitoring the progress of data transfers between PEs. It is generally desirable to automatically recognize when opportunities for data transfers arise (for example, when data items or communication networks become available, data items are updated, or other data selection criteria 220 are met). It is also desirable to automatically complete transfers of data items that may have been previously interrupted.

Referring again to RDAS 101 depicted in FIG. 2, DRM engine 216 represents any digital rights management system or technique operable to enable acquisition of digital licenses covering aspects of the operation of RDAS 101.

Identity management engine 214 is responsible for establishing a level of trust between devices. There are numerous well-known techniques available for establishing trust between devices through authentication and authorization schemes. Authentication is the process of identifying a user. Authorization is the process of enforcing policies relating to what types or qualities of activities, resources, or services the user is permitted to access. In some cases, authentication may encompass the authorization process. In general, identity management engine 214 provides for: representing user identities 222; conducting communications between identity providers, relying parties, and identity subjects; and using appropriate protocol(s) for handling claims. In one exemplary implementation, PEs within PEG 104 facilitate selection of a particular identity associated with user 111 for presentation to a WAN-based RDAS 101 and/or other PEs to achieve varying amounts of access to data items 115. Identities may be selected manually (via RDAS interface 204, for example) or automatically.

Figure 3:
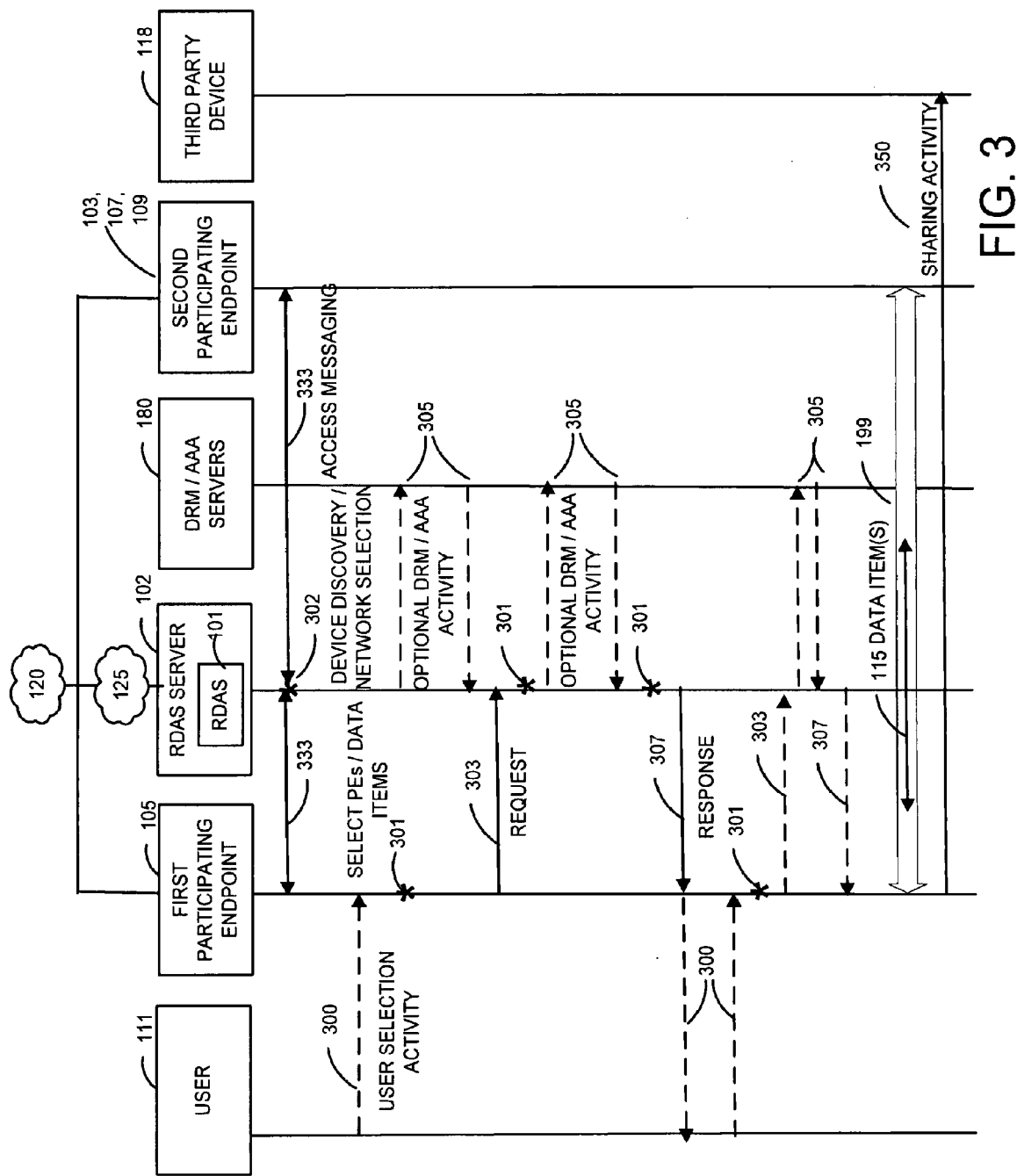
FIG. 3 is a message sequence chart illustrating certain aspects of a method for remote data access using the architecture shown in FIG. 1.

With continuing reference to FIGS. 1 and 2, FIG. 3 is a message sequence chart illustrating certain aspects of a method for remote data access using the architecture shown in FIG. 1. The method(s) illustrated in FIG. 3 may be implemented using computer-executable instructions executed by one or more general, multi-purpose, or single-purpose processors (exemplary computer-executable instructions 406 and processor 402 are discussed further below, in connection with FIG. 4). Unless specifically stated, the methods described herein are not constrained to a particular order or sequence. In addition, some of the described methods or elements thereof can occur or be performed concurrently. It will be understood that all of the described messaging need not occur in each remote data access transaction, and the type, quantity, and implementation of specific messaging is a matter of implementation preference.

For exemplary purposes, one remote data access transaction between a first PE and a second PE is discussed. Although data access transactions may be initiated by any PE, for discussion purposes the first PE is deemed to be portable electronic device 105 (referred to as a PDA). Depending on the exemplary context, data item(s) 115 accessed via PDA 105 may be stored by any PE within PEG 104, and the second PE may be any another PE within PEG 104, such as server 103, PC 109, or home entertainment device 107.

Referring to the message sequence chart, access messaging 303 represents any signal transmitted using any suitable protocol between any PE within PEG 104 and WAN-based RDAS 101 for the purpose of obtaining services provided via WAN-based RDAS 101. For discussion purposes, it is assumed that both PDA 105 and the desired second PE have registered with WAN-based RDAS 101 via the Internet. In one exemplary scenario, the PEs may have current IP addresses and port numbers assigned to their respective PE-based RDASs 101. In another exemplary scenario, network address translation techniques and address caching may be employed by WAN-based RDAS 101 to translate IP addresses used within the network in which PDA 105 operates and the network within which the desired second PE operates.

It may be desirable to establish a level of trust between WAN-based RDAS 101 and PEs within PEG 104. Such trust may be established using any now known or later developed technology. For example, performance of security-related authentication, authorization, and accounting ("AAA") activities or digital rights management ("DRM") activities may occur, as indicated by arrows 305. It will be appreciated that AAA/DRM activities 305 may occur at any desired point throughout the remote data access transaction. In addition either the first PE 105 or the second PE may need to contact AAA/DRM servers directly without WAN-based RDAS 101 in order to complete requested operations.

In one exemplary implementation, PEs present a particular user identity 222 to WAN-based RDAS 101, and upon verification of the particular user identity, WAN-based RDAS 101 provides various levels of access to other PEs within PEG 104 and/or data items 115. RDAS 101 can use other servers (such as DRM/AAA servers 180) to provide authentication services on behalf of the RDAS for any particular user identity that is submitted by a PE. In one scenario, user 111 is prompted to select a user identity 222 from among a number of possible identities via a user interface. In an alternative scenario, a user identity 222 is automatically selected by a particular PE based on flexible criteria such as a SIM ID in a cellular communications network. One or more claims, which may be self-issued and/or verifiable via AAA/DRM servers 180 are generally made regarding items of information associated with each user identity 222 (together items of information and claims are referred to as "credentials").

Referring again to the message sequence chart of FIG. 3, device discovery/network selection asterisk 302 represents activity performed via WAN-based RDAS 101 to identify network-accessible PEs within PEG 104, along with information (such as network identifiers, device addresses, and port numbers) usable by PEs to establish communication sessions with each other. It is assumed that WAN-based RDAS 101 has supplied a list of currently available second PEs to PDA 105 via access messaging 333. Depending on the level of trust established between WAN-based RDAS 101 and available PEs, WAN-based RDAS 101 may or may not supply IP addresses (or other endpoint identifiers and/or port numbers) of the available second PEs, or access to catalogs of data items stored by the available second PEs. It will be appreciated that varying levels of trust can be established based on the claims presented by the user identity—for example, an anonymous user identity claim may only result in very general access to shared services without providing the ability to search for other PEs.

At appropriate points throughout the remote data access transaction, available PEs and/or data items 115 are selected, as indicated at asterisks 301. It will be appreciated that at any point prior to or after selection of PEs and/or data items by PE-based RDASs 101 or WAN-based RDAS 101, AAA/DRM activities 305 may be performed. The selection of PEs and/or data items 115 generally involves the evaluation of data selection criteria 220, user identities 222, PE characteristics 224, or network characteristics 226. For example, in the context of the exemplary remote data access transaction, PDA 105 is used to select second PE 103, 107, or 109 and/or data item(s) 115. User 111 may browse a list of PEs within PEG 104 that is maintained by WAN-based RDAS 101 and select the second PE and/or data item(s) to be accessed, for example. Alternatively, user 111 may have previously specified certain data selection criteria 220, PE characteristics 224, or network characteristics 226 that can be used by PDA 105 or WAN-based RDAS 101 to automatically select the second PE and/or data items. Further it is possible that PDA 105 first establishes communication session 199 with second PE prior to being able to discover data items 115 that may be available. It will be appreciated that selected data items may or may not be stored on PDA 105. It will be appreciated that WAN-based RDAS 101 or PE-based RDASs 101 may use certain desirable data access features to facilitate selection of data items. For example, selected data items 115 may have (or may be transcoded to have) formats that are usable by particular PEs, synchronization conflicts may be resolved for selected data items, and opportunities for efficient, timely, or cost-effective transfers of data items between PEs may be recognized.

Referring again to the flowchart of FIG. 3, PDA 105 directs a request message 303 to WAN-based RDAS 101. Request message 303 is any signal transmitted using any suitable protocol by or on behalf PDA 105 for the purpose of contacting WAN-based RDAS 101. Because it has been assumed that PEs within PEG 104 have previously established communication with WAN-based RDAS 101 and provided IP addresses or other endpoint identifiers to WAN-based RDAS 101, request message 303 will generally be used to request the IP address and port associated with a selected second PE (if such information has not previously been provided), and/or request the enumeration/selection of data items stored by other PEs within PEG 104.

WAN-based RDAS 101 directs a response message 307 to PDA 105. Response message 307 is any signal transmitted using any suitable protocol by or on behalf WAN-based RDAS 101 for the purpose of contacting a particular PE. In the context of the exemplary remote data access transaction, response message 307 generally permits access to the service requested by PDA 105 via request message 303. Further rounds of user selection activity 300, request messages 303, DRM/AAA activity 305, and response messages 307 may occur, if necessary, based on the specifics of the desired remote access transaction. For example, certain DRM activities (such as granting or obtaining appropriate digital licenses) may be performed before or after data items protected by enforceable intellectual property rights are selected and/or accessed via communication session 199.

As next indicated in the message sequence chart, communication session 199 is established. Communication session 199 is a direct or proxied connection between PDA 105 and the selected second PE that provides transport and/or encoding for selected data items via one or more communication networks 110. Communication session 199 may be established using any desirable now known or later developed protocol or technique supported by an applicable communication network. Examples of communication protocols or techniques include but are not limited to: Internet protocols; mobile data transmission protocols; cable transmission protocols; over-the-air broadcasting protocols; and satellite transmission protocols. In one exemplary implementation, PDA 105 establishes an MTP connection using the IP address and port number of the second PE obtained from WAN-based RDAS 101. As discussed above, communication session establishment may involve additional AAA/DRM activity 305. For example, it may be desirable to provide secure/encrypted data transport between PDA 105 and the second PE.

Once communication session 199 has been established, selected data items 115 may be identified or accessed via the communication session (for example, data items may be uploaded, downloaded, synchronized, accessed, or otherwise transferred between PDA 105 and the selected second PE). Data items may also be manually or automatically shared with/distributed to third party devices, as indicated by sharing activity arrow 350, using peer-to-peer transport or other forms of transport (such as email, shared storage, pushing remotely stored data items to designated devices, SMS or text messaging, RSS feeds, posting to Web sites, transmitting to related individuals such as buddies on a buddy list, etc.)

It will be appreciated that virtually unlimited types of remote data access transactions between PEs within PEG 104 are enabled via the techniques and architecture 100 described herein.

In one exemplary transaction, a user uses his mobile phone or other portable electronic device to remotely access documents stored in his PC, and automatically synchronizes them with third party devices (for example, others participating in the same online meeting). Once the synchronization has been established, the document is kept up to date as each individual makes changes. In another exemplary transaction, a user uses her mobile phone or other portable electronic device(s) to remotely control another PE within PEG 104 using known or developed control protocols that operate over communication network(s) 110.

In another exemplary transaction, the user uses his mobile phone or other portable electronic device to browse one or more catalogs of content within other devices that store data items on behalf of the user. Once the user discovers desirable content, he may be permitted to stream, transfer, or synchronize the content depending on the rights associated with his user identity.

In yet another exemplary remote data access transaction, the user uses his online data storage service as "backup storage" for digital media content he consumes on his PDA or other portable electronic device. In one such example of the use of the online data storage service, a DVR application running on the PDA is recording from a mobile broadcast source, and when the video content exceeds the storage capacity of the PDA, the video content is automatically offloaded, or cached, to the online data storage service to alleviate memory constraints on the PDA 105. In another such example of the use of the online data storage service, the user selects RSS feeds on his PC, and the RSS feeds are automatically captured by the online data storage service. Then, the RSS feeds are synchronized from the online data storage service to a portable electronic device such as a PDA.

In a further exemplary transaction, the user uses his in-vehicle RDAS to select a certain song stored within his PC, and synchronizes it to the vehicle.

In a still further exemplary transaction, the user specifies preferences via a user interface on his mobile phone or other portable electronic device that enable WAN-based RDAS 101 to intelligently synchronize data items between all of the PEs in the user's participating endpoint group.

In a yet still further exemplary transaction, the user uses his near-field communication—equipped PDA or other portable electronic device to make purchases at local stores, and at the end of the day he synchronizes the consumer transaction data that has been generated with his PC-based Microsoft® Money™ application, and also with his online banking service. In another exemplary transaction, the user synchronizes all information and device settings from his mobile phone so that they may be restored if the phone's memory is erased or a new phone is obtained.

Thus, it can be seen that the platform defined by RDAS 101 enables a wide variety of portable and non-portable devices to participate in a connected ecosystem. Participating devices can synchronize, search/browse, remotely control other devices, and share data items whether or not the data items are present on a particular device. The use of filters such as data selection criteria, device characteristics, and network characteristics can be used to create algorithms for "intelligent" device/data item selection and data access. In addition, technologies adapted for multimaster synchronization topologies guarantee that data on each endpoint is correctly updated as changes are made and conflicts resolved as necessary. The use of DRM and identity management techniques in combination with the remote data access service platform described herein accommodates a wide variety of business models that simultaneously support the often diverse interests of individuals and intellectual property rights holders.

With continued reference to FIGS. 1-3, FIG. 4 is a block diagram of an exemplary configuration of an operating environment 400 (such as a PE-side operating environment or a network-side operating environment) in which all or part of RDAS 101, and/or the method(s) shown and discussed in connection with FIG. 3 may be implemented or used. Operating environment 400 is generally indicative of a wide variety of general-purpose or special-purpose computing environments, and is not intended to suggest any limitation as to the scope of use or functionality of the system(s) and methods described herein.

As shown, operating environment 400 includes processor 402, computer-readable media 404, user interfaces 416, communication interfaces 418, and specialized hardware 414. Computer-executable instructions 406 are stored on computer-readable media 404, as are data selection criteria 220, user identities 222, data items/catalogs 115, PE characteristics 224, and network characteristics 226. One or more internal buses 420 may be used to carry data, addresses, control signals and other information within, to, or from operating environment 400 or elements thereof.

Processor 402, which may be a real or a virtual processor, controls functions of operating environment 400 by executing computer-executable instructions 406. Processor 402 may execute instructions 406 at the assembly, compiled, or machine-level to perform a particular process.

Computer-readable media 404 represent any number and combination of local or remote devices, in any form, now known or later developed, capable of recording, storing, or transmitting computer-readable data, such as computer-executable instructions 406. In particular, computer-readable media 404 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 404 may also include transmission media and data associated therewith. Examples of transmission media/data include, but are not limited to, data embodied in any form of wireline or wireless transmission, such as packetized or non-packetized data carried by a modulated carrier signal.

Computer-executable instructions 406 represent any signal processing methods or stored instructions. Generally, computer-executable instructions 406 are implemented as software components according to well-known practices for component-based software development, and encoded in computer-readable media (such as computer-readable media 404). Computer programs may be combined or distributed in various ways. Computer-executable instructions 406, however, are not limited to implementation by any specific embodiments of computer programs, and in other instances may be implemented by, or executed in, hardware, software, firmware, or any combination thereof.

As shown, certain computer-executable instructions 406 implement communication functions 482, which implement aspects of communication manager 202; certain computer-executable instructions 406 implement DRM functions 486, which implement aspects of DRM engine 216; certain computer-executable instructions 406 implement data selection functions 488, which implement aspects of data selection engine 212; and certain computer-executable instructions 406 implement ID management functions 484, which implement aspects of identity management engine 214.

User interface(s) 416 are physical or logical elements that define the way a user interacts with a particular application or device, such as client-side operating environment 400. Generally, presentation tools are used to receive input from, or provide output to, a user. An example of a physical presentation tool is a display such as a monitor device. An example of a logical presentation tool is a data organization technique (such as a window, a menu, or a layout thereof). Controls facilitate the receipt of input from a user. An example of a physical control is an input device such as a remote control, a display, a mouse, a pen, a stylus, a microphone, a keyboard, a trackball, or a scanning device. An example of a logical control is a data organization technique via which a user may issue commands. It will be appreciated that the same physical device or logical construct may function as an interface for both inputs to, and outputs from, a user.

Communication interface(s) 418 are one or more physical or logical elements that enable communication by operating environment 400 via one or more protocols or techniques usable in connection with networks 110.

Specialized hardware 414 represents any hardware or firmware that implements functions of operating environment 400. Examples of specialized communication hardware include encoder/decoders ("CODECs"), decrypters, application-specific integrated circuits, secure clocks, and the like.

It will be appreciated that particular configurations of operating environment 400 or RDAS 101 may include fewer, more, or different components or functions than those described. In addition, functional components of operating environment 400 or RDAS 101 may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. One or more computer-readable memories encoded with computer-executable instructions which, when executed by a processor, perform remote data access, comprising:
   identifying a group of participating endpoints, each participating endpoint in the identified group comprising an end-user electronic device storing data items, the group of participating endpoints being configured in a network topology in which concurrent access to the stored data items is enabled for each of the participating endpoints;
   receiving from a first participating endpoint of the group of participating endpoints, a selection of a second participating endpoint of the group of participating endpoints;
   accessing a service configured for i) exposing a catalog identifying individual data items that are stored on the various participating endpoints in the group, and ii) specifying access rights to cataloged individual data items based on capabilities of participating endpoints in the group; and
   providing access to a cataloged individual data item to the first participating endpoint, the access being provided in accordance with the access rights specified by the service.

2. The one or more computer-readable memories of claim 1 further including
   establishing a communication session between the first participating endpoint and the second participating endpoint over a communication network identified by the service, and
   arranging for the first participating endpoint to access the cataloged individual data items in the communication session.

3. The one or more computer-readable memories of claim 2 in which the establishing of the communication session comprises
   establishing a packet data tunnel between the first participating endpoint and the second participating endpoint, the packet data tunnel configured to transfer data packets between the first participating endpoint and the second participating endpoint.

4. The one or more computer-readable memories of claim 1 further including
   receiving a user selection of a particular data item from the first participating endpoint, the user selection being performed on a user interface configured for browsing the catalog of available data items stored by the various participating endpoints in the group, in which the available data items are included in the catalog based on capabilities of the first participating endpoint.

5. The one or more computer-readable memories of claim 4 further including arranging for the first participating endpoint to access the particular data item in the communication session by enabling the particular data item to be uploaded from, or downloaded to, the first participating endpoint.

6. The one or more computer-readable memories of claim 4 further including arranging for the first participating endpoint to access the particular data item via the communication session by synchronizing the particular data item between the first participating endpoint and the second participating endpoint.

7. The one or more computer-readable memories of claim 4 further including
   after the first participating endpoint accesses the particular data item in the communication session, sharing the particular data item with a third party, the sharing the particular data item comprising sharing the data item using a technique that includes at least one of emailing, granting access via a network-based information repository, pushing from the network-based information repository, streaming, short-messaging, text-messaging, or posting to the one or more computer-readable memories or to a different computer-readable memory.

8. An apparatus, comprising:
   a communication interface;
   a computer-readable memory; and
   a processor responsive to the computer-readable memory, to the communication interface, and to computer-executable instructions stored on the computer-readable memory, the computer-executable instructions executable by the processor for
   identifying a group of participating endpoints, each participating endpoint in the group comprising an end-user electronic device storing data items, the group of participating endpoints being configured in a network topology in which concurrent access to the stored data items is enabled for each of the participating endpoints,
   receiving from a first participating endpoint of the group of participating endpoints, a selection of a second participating endpoint of the group of participating endpoints, the selection being performed on a user interface presented by the first participating endpoint, the user interface configured to display the various participating endpoints in the group,
   accessing a service configured for i) exposing a catalog of individual data items that are stored on the various participating endpoints in the group, and ii) specifying access rights to cataloged individual data items based on capabilities of participating endpoints in the group, and
   providing access to a cataloged individual data item to the first participating endpoint, the access being provided according to the access rights specified by the service.

9. The apparatus of claim 8 in which the catalog of individual data items includes generic representations of the data items stored by the various participating endpoints in the group.

10. The apparatus of claim 8 in which the catalog comprises references to the data items stored on each participating endpoint in the group.

11. The apparatus of claim 8 further including
    establishing a communication session between the first participating endpoint and the second participating endpoint over a communication network identified by the service, and arranging for the first participating endpoint to access the cataloged individual data item in the communication session.

12. The apparatus of claim 11 in which the communication session comprises one of a client-server communication session or a peer-to-peer communication session.

13. The apparatus of claim 8 further including automatically identifying an individual data item by evaluating data selection criteria, the data selection criteria being at least one of participating endpoint characteristics, data item characteristics, user profiles, user preferences, or network characteristics.

14. The apparatus of claim 8 in which the access rights are established according to at least one of data selection criteria, user identities, characteristics of the participating endpoints, network characteristics, or combinations thereof.

15. The apparatus of claim 8 further including establishing a packet data tunnel between the first participating endpoint and the second participating endpoint, the packet data tunnel configured to transfer data packets between the first participating endpoint and the second participating endpoint in which the first participating endpoint is a portable electronic device and a proxy server serves as a point of interconnection between the portable electronic device and the second participating endpoint.

16. A method for remote data access comprising the steps of:
- identifying a group of participating endpoints, each participating endpoint in the identified group comprising an end-user electronic device storing data items, the group of participating endpoints being configured in a network topology in which concurrent access to the stored data items is enabled for each of the participating endpoints;
- receiving from a first participating endpoint of the group of participating endpoints, a selection of a second participating endpoint of the group of participating endpoints;
- accessing a WAN-based data access service configured for i) exposing a catalog identifying individual data items that are stored on the various participating endpoints in the group, and ii) specifying access rights to cataloged individual data items based on capabilities of participating endpoints in the group; and
- providing access to a cataloged individual data item to the first participating endpoint, the access being provided in accordance with the access rights specified by the WAN-based data access service.

17. The method of claim 16 further including
- selecting a format for a particular data item based on a characteristic of the first participating endpoint or the network or both;
- transcoding the particular data item into the selected format; and
- after the data item has been transcoded into the selected format, arranging for the first participating endpoint to access the transcoded data item.

18. The method of claim 16 in which the particular data item is protected by a predetermined intellectual property right, and further including:
- arranging for granting, using a digital rights management technique, a right to a user under the predetermined intellectual property right,
- the right being at least one of: the right to render the particular data item; the right to prepare derivative works of the specific data item; the right to reproduce the particular data item; and the right to distribute the particular data item.

19. The method of claim 16 in which the WAN-based data access service interacts with a client-based application or an application that is distributed across a plurality of participating endpoints.

20. The method of claim 16 in which the capabilities include one or more of processing capability, network connectivity capabilities, display capabilities, or memory capabilities.

* * * * *